United States Patent [19]

Chiao

[11] Patent Number: 4,717,395
[45] Date of Patent: Jan. 5, 1988

[54] GAS SEPARATIONS USING MEMBRANES COMPRISING SULPHONATED POLYETHER SULPHONE

[75] Inventor: Cherry C. Chiao, Danville, Calif.

[73] Assignee: The Dow Chemical Company, Midland, Mich.

[21] Appl. No.: 894,190

[22] Filed: Aug. 7, 1986

[51] Int. Cl.$^4$ .............................................. B01D 53/22
[52] U.S. Cl. ............................................ 55/16; 55/68
[58] Field of Search ............................. 55/16, 68, 158; 210/638, 500.41; 264/41

[56] References Cited

U.S. PATENT DOCUMENTS

| | | | |
|---|---|---|---|
| 3,709,841 | 1/1973 | Quentin | 210/500.41 X |
| 3,780,496 | 12/1973 | Ward, III et al. | 55/16 |
| 3,855,122 | 12/1974 | Bourganel | 210/638 |
| 3,875,096 | 4/1975 | Graefe et al. | 264/41 X |
| 3,994,860 | 11/1976 | Brousse | 210/500.41 X |
| 4,026,977 | 5/1977 | Bourganel | 210/500.41 X |
| 4,029,582 | 6/1977 | Ishii et al. | 55/16 X |
| 4,054,707 | 10/1977 | Quentin | 428/213 |
| 4,067,803 | 1/1978 | Quentin | 210/500.41 X |
| 4,080,743 | 3/1978 | Manos | 55/16 X |
| 4,118,439 | 10/1978 | Marze | 526/240 X |
| 4,207,182 | 6/1980 | Marze | 210/490 X |
| 4,208,508 | 6/1980 | Hashino et al. | 210/500.41 X |
| 4,268,650 | 5/1981 | Rose | 525/534 |
| 4,273,903 | 6/1981 | Rose | 210/500.41 X |
| 4,414,368 | 11/1983 | Coplan et al. | 525/534 |
| 4,427,419 | 1/1984 | Li | 55/16 |
| 4,472,175 | 9/1984 | Malon et al. | 55/16 |
| 4,508,852 | 4/1985 | Bikson et al. | 210/500.41 X |
| 4,568,579 | 2/1986 | Watson | 55/16 X |
| 4,596,860 | 6/1986 | Percec et al. | 55/16 X |

FOREIGN PATENT DOCUMENTS

| | | | |
|---|---|---|---|
| 142973 | 5/1985 | European Pat. Off. | 210/500.41 |
| 145305 | 6/1985 | European Pat. Off. | 210/500.41 |
| 2293960 | 8/1976 | France | 210/500.41 |
| 137964 | 7/1985 | Japan | 210/500.41 |
| 1473857 | 5/1977 | United Kingdom . | |

OTHER PUBLICATIONS

Ellig et al., J. of Membrane Science, 6 (No. 2), (1980), 259-263, Concentration of Methane from Mixtures With Carbon Dioxide by Permeation Through Polymeric Films.

D. R. Lloyd et al., Asymmetric Membrane Preparation From Solventless Casting Systems, pp. 152-155.

T. P. Ventoza et al., Use of the Three Component Solubility Parameter in Asymmetric Phase Inversion Membrane Preparation, pp. 713-717.

*Primary Examiner*—Robert Spitzer

[57] ABSTRACT

The invention is a method of separating a gas comprising oxygen, nitrogen or carbon dioxide from a mixture of gases containing oxygen, nitrogen or carbon dioxide wherein the method comprises A. contacting the gas mixture with a membrane containing a thin dense discriminating layer comprising a polymer of sulphonated polyether sulphone under conditions such that oxygen, nitrogen or carbon dioxide selectively permeates through the membrane to the other side of the membrane; and, B. removing the permeated oxygen, nitrogen, or carbon dioxide from the other side of the membrane.

The membranes useful in this invention demonstrate good selectivity for oxygen over nitrogen and carbon dioxide over light hydrocarbons and nitrogen over light hydrocarbons. Furthermore, the permeabilities of oxygen and carbon dioxide through these membranes are quite good.

9 Claims, No Drawings

GAS SEPARATIONS USING MEMBRANES COMPRISING SULPHONATED POLYETHER SULPHONE

BACKGROUND OF INVENTION

This invention relates to a novel method of separating oxygen, nitrogen or carbon dioxide from gas mixtures containing such gases using membranes comprising sulphonated polyether sulphones.

In recent years there has been an increasing demand for the separations of gases in gas mixtures. One such separation is the separation of oxygen from nitrogen. In certain embodiments, it is desirable to use enriched oxygen streams, for example, to enhance combustion of certain materials. In other embodiments, it is desirable to have nitrogen with very little oxygen in it, for example, in fruit or food storage and shipping. There is also a demand for separating carbon dioxide from gas streams containing carbon dioxide, including separating carbon dioxide from light hydrocarbons. It is also desirable to separate nitrogen from natural gas or light hydrocarbons including methane.

One such method for performing these separations is to contact the gas mixture with a membrane which is selectively permeable for one of the components of the gas mixture. In such embodiment, the selectively permeable gas passes through the membrane at a faster rate than the other gas, and by collecting the selectively permeated species on the opposite side of the membrane, some degree of separation can be achieved.

The need is to find membranes which provide a high permeability for the selectively permeable species, a high ratio of permeation of the selectively permeable species as compared to the non-selectively permeable species, and good mechanical properties.

SUMMARY OF INVENTION

The invention is a method of separating a gas comprising oxygen, nitrogen or carbon dioxide from a mixture of gases containing oxygen, nitrogen or carbon dioxide wherein the method comprises
A. contacting the gas mixture with a membrane containing a thin dense discriminating layer comprising a polymer of sulphonated polyether sulphone under conditions such that oxygen, nitrogen or carbon dioxide selectively permeates through the membrane to the other side of the membrane; and,
B. removing the permeated oxygen, nitrogen, or carbon dioxide from the other side of the membrane.

The membranes useful in this invention demonstrate good selectivity for oxygen over nitrogen and carbon dioxide over light hydrocarbons and nitrogen over light hydrocarbons. Furthermore, the permeabilities of oxygen and carbon dioxide through these membranes are quite good.

DETAILED DESCRIPTION OF THE INVENTION

Membranes useful in this invention are derived from polymers which comprise sulfonated polyether sulfones. Preferably, the membranes useful in this invention comprise polymers which comprise units of the formula

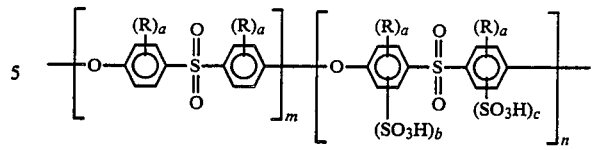

wherein
R is independently in each occurrence alkyl or halo;
a is independently in each occurrence an integer of about 0 to about 4;
b is independently in each occurrence 0 to 4;
c is independently in each occurrence 0 to 4;
m is 0 or greater;
n is 1 or greater;
with the provisos that in each ring a+b is 0 to 4, in each ring a+c is 0 to 4, and the sum of b and c in each unit is at least 1.

Preferably, R is $C_{1-10}$ alkyl and more preferably methyl. Preferably, the halo group is a bromo or a chloro group with the bromo group most preferred. Preferably, the sum of b and c in each unit is 1.

Preferably, a is 0 or 1, and most preferably 0. Preferably, b is 0 or 1. Preferably, c is 0 or 1.

As the percentage of sulfone units which are sulfonated as compared to those which are not sulfonated goes up the selectivity for oxygen over nitrogen and for carbon dioxide over methane goes up, while the permeability goes down. The membranes in this invention may contain any percentage of sulfonated to non-sulfonated sulfone units which gives the desired selectivity and permeabilities. Preferably, the percentage of sulfonated sulfone units in the polymer is between about 1 and 20 percent of the sulfone units. More preferably, the percentage of sulfone units in the polymer which contains pendant sulfonate moieties is between about 10 and about 15.

The polymers useful in the process of this invention are those which have sufficient mechanical strength to withstand the usage conditions, that is the temperatures, pressures, flow rates, and the like, under which these separations take place. Such polymers preferably have a molecular weight of between about 100,000 and 350,000, and more preferably have a molecular weight of between about 160,000 and 280,000.

The polymers useful in this invention can be prepared by the processes disclosed in U.S. Pat. No. 4,054,707; European Pat. No. 29-633; Australian Pat. No. 8,435,743A, U.S. Pat. No. 3,875,096; all incorporated herein by reference.

The membranes useful in this invention can take any form known to one skilled in the art. In particular, the membrane may be a homogeneous membrane, a composite membrane, or an asymmetric membrane. Homogeneous and composite membranes are prepared by forming a thin, discriminating layer which is dense and free of voids and pores. Such membranes or layers have generally the same structure and composition throughout the membrane. Examples of a method for preparing such membranes are disclosed in Australian Pat. No. 8,435,743A U.S. Pat. No. 4,207,182; U.S. Pat. No. 4,054,707; U.S. Pat. No. 3,875,096; Lloyd et al. *Polymer Material Science Engineering*, 50; 152 (1984); Ventoza et al. *Polymer Material Science Engineering*, 51, 713 (1984), all incorporated herein by reference.

The polymers useful as membranes in this invention can be fabricated into membranes by any process known to the skilled artisan. The membranes may be flat sheet membranes or spiral wound membranes wherein the sheets are prepared by extrusion, compression molding, blow molding, casting from solutions or dispersions, melt casting, and the like. Alternatively, the polymers may be melt spun into tubular or hollow fiber form membranes. Such processes for the formation of such membranes are well known to those skilled in the art.

Membranes of any form, flatsheet or hollow fiber, may be extruded from sulfonated polyether sulphone by dissolving the polymer in a solvent or a solvent and non-solvent pair and extruding the solution through a die of the desired shape. The polymer concentration is such that the solution has sufficient viscosity to be extrudable. The lower limit on the extrusion temperature for a given solution is that temperature at which the solution has low enough viscosity to allow pumping. The upper limit on the extrusion temperature is that temperature at which the solution has high enough viscosity so that the extruded shape retains its integrity, for example, an extruded hollow fiber does not collapse. Preferred temperatures are between about 20° and about 130° C., with between 100° and 120° C. being preferred. Preferred solvents for the sulfonated polyether sulfones are chosen on the basis of the degree of sulfonation. Generally, as the degree of sulfonation increases more polar solvents are preferred. Solvents more desirable for polyether sulfones with a low degree of sulfonation include dimethyl formamide, dimethyl acetamide, N-methyl pyrrolidinone, dimethylsulfoxide, and chlorinated organic solvents. Solvents more desirable for polyether sulfones with a high degree of sulfonation include tetrahydrofuran, alcohol, alcohol-water mixtures, and water.

The membranes may also be formed by solution casting. The polymer is dissolved in a solvent. The concentration of the polymer in the solvent is preferably between about 10 and 20 percent by weight. Thereafter, the polymer solution or dispersion is cast on a surface, and in the case of a homogeneous membrane on a surface from which the finished membrane may readily be separated. A convenient way of carrying out this operation is either by casting the membrane solution onto a support surface which may be dissolved away from the finished film following the drying step or by casting the membrane onto a support such as glass, or a surface to which the membrane will not adhere, such as mercury. Casting is done by pouring the solution or dispersion onto the appropriate surface and sizing using the appropriate tool, to form a solution or dispersion of the appropriate thickness. Thereafter, the cast solution or dispersion is exposed to drying conditions. Such conditions are used to remove the solvent thereby leaving a thin, discriminating layer of polymer which is homogeneous. The solution can be dried either by exposing to a vacuum, exposing to elevated temperatures, by allowing the solvent to evaporate by time, or any combination thereof. It is preferable to dry the cast solution at temperatures, less than about 100° C. In one preferred embodiment, such exposure is done in a vacuum oven or under vacuum conditions at elevated temperatures. Preferably, the homogeneous membrane has a thickness of between about 5 microns and about 50 microns, and most preferably between about 20 microns and about 15 microns.

To prepare a composite membrane, a homogeneous thin, discriminating layer can be formed, and thereafter adhered to a porous support after formation. Alternatively, the porous support can be the surface upon which the membrane is cast. In such embodiment, composite membrane is prepared by casting a forming solution or dispersion as a uniform coating on the porous support which forms the support layer for the finished membrane. Penetration of the polymer from which the thin, discriminating layer is formed into pores of the porous supporting layer and the layer itself is acceptable so long as the desired thickness of the semi-permeable membrane is not exceeded. In a composite membrane, the membrane is supported on a porous substrate or structure. This porous supporting layer is characterized in that it does not greatly impede the transport across this layer of all components of a fluid in contact with the porous layer. The porous supporting layer can comprise a discriminating layer which impedes the transportation of some fluid components to the discriminating layer, but generally this second discriminating layer is not necessary or desirable. In one embodiment, the supporting layer can be a metal or polymeric plate with a plurality of holes drilled through it. However, such a drill plate is not advantageous because it can significantly reduce the effective area of the membrane. In a preferred embodiment, the porous supporting layer is a very porous polymer membrane. Illustrative of such polymeric supporting layers are nylon, poly (vinyl fluoride), cellulose ester and microporous polysulfone membranes or polyether sulfone. Examples of such supports which are commercially available under the trade names, MILLIPORE, PELLICON and DIAFLOW. Where such supports are thin or highly deformable, a frame may also be necessary to adequately support the semipermeable membrane and the support. In one especially preferred embodiment, the polymeric supporting layer is a hollow fiber of a microporous polymer such as polysulfone, nylon, cellulose acetate, or some other cellulose ester. The hollow fiber itself provides adequate support for the semi-permeable membrane layer coated on the inside or outside surface of the fiber. After the solution or dispersion useful in forming the thin, discriminating layer is cast on the porous support, the porous support and solution cast thereon are then exposed to conditions for removal of the solvent so as to form the dense skin. Such conditions are similar to those described hereinbefore for the formation of the homogeneous membrane. The dense discriminating layer of such membranes preferably have a thickness of between about 0.01 microns and about 10 microns; and more preferably between about 0.05 microns and about 1.0 microns.

Under certain conditions, it may be highly desirable to provide support to the membrane when the membrane is employed in a separation apparatus or process. In one embodiment, the peripheral area of the membrane is affixed to a framing structure which supports the outer edge of the membrane. The membrane can be affixed to the framing structure by a clamping mechanism, adhesive, chemical bonding, or other techniques known in the prior art. The membrane affixed to the frame can then be sealingly engaged in the conventional manner in a vessel so that the membrane surface inside the framing support separates two otherwise non-communicating compartments in the vessel. The skilled artisan will recognize that the structure which supports the membrane can be an integral part of the vessel or even the outer edge of the membrane.

As used herein, the term semi-permeable membrane refers to a membrane which displays different permeabilities for different species of molecules and therefore, may be used in the separation of such molecules having different permeabilities across the membranes. These molecules in this invention are preferably present in a gaseous form.

In practice, a gaseous mixture containing oxygen, nitrogen or carbon dioxide is contacted with the membrane, such that the gaseous mixture is on one side of the membrane which separates the non-communicating compartments in the vessel. The species which preferentially permeates through the membrane is removed from the other compartment in the vessel. In this invention, the preferentially permeating species are oxygen, nitrogen or carbon dioxide. In one preferred embodiment, oxygen is separated from air. In another preferred embodiment, carbon dioxide is separated from natural gas or light hydrocarbons, such as methane. In still another embodiment, nitrogen is separated from natural gas or light hydrocarbons, such as methane. It is to be noted that the non-preferentially permeating species will permeate through the membrane, the product taken off of the membrane is generally not free of the non-preferentially permeating species, but is much richer in the preferentially permeating species, for example, oxygen, carbon dioxide or nitrogen.

In many of these separations, the force which drives the preferentially permeating species across and through the membrane is a pressure differential between the feed side of the membrane and the permeate side of the membrane. Feed side of the membrane refers herein to that side of the membrane to which the gaseous mixture from which the desired species is to be separated is contacted. Permeate side of the membrane is that side of the membrane to which the species permeate and on which the stream richer in the preferentially permeating species can be found. Preferably, in the separation of oxygen from air this pressure differential is between about 90 (620 kPa) and about 250 psi (1720 kPa). In the separation of nitrogen, carbon dioxide from light hydrocarbons or natural gas the pressure differential across the membrane is between about 280 (1930 kPa) and about 900 psi (6200 kPa). In the embodiment wherein oxygen is separated from nitrogen, the separation can take place at temperatures of between about 0° and about 100° C., more preferably between about 0° and 50° C. In that embodiment where nitrogen or carbon dioxide is separated from light hydrocarbons or natural gas, the separation can take place at temperatures between about −10° and about 120° C.

The membranes of this invention, under preferred conditions, give a separation factor of oxygen over nitrogen of 6.2 or greater, more preferably about 7.0 or greater, and most preferably, 8.0 or greater. Permeabilities as used hereinafter are in the units of $cm^3(STP) \cdot cm/cm^2 \cdot s \cdot cmHg$. The permeability for oxygen is preferably $0.15 \times 10^{-10}$ or greater, and more preferably $0.20 \times 10^{-10}$ or greater. Under preferred conditions, the separation factor for carbon dioxide over methane is 50 or greater, and under more preferred conditions, 70 or greater. The permeabilities for carbon dioxide under preferred conditions are $1 \times 10^{-10}$ or greater, and under more preferred conditions, $2 \times 10^{-10}$ or greater. Under preferred conditions the separation factor for nitrogen over methane is 1.3 or greater, under more preferable conditions 2.0 or greater. In the separation of nitrogen from methane, the permeabilities of nitrogen under preferred conditions are $0.02 \times 10^{-10}$ or greater, and under more preferred conditions $0.03 \times 10^{-10}$ or greater.

SPECIFIC EMBODIMENTS

The following examples are included for illustrative purposes only and are not intended to limit the scope of the invention or the claims. Unless otherwise stated, all parts and percentages are by weight.

EXAMPLES 1-7

Membrane Preparation

Membranes of polyether sulfone and sulfonated polyether sulfone are prepared by solution casting. About 1.5 g of the dried polymer is dissolved in 8.5 g of dimethylformamide (DMF) to make a 15% solution. A film is cast on a glass plate with a 0.01" casting bar. The solvent is evaporated from the covered film in a hood at room temperature overnight. The film is then peeled from the glass plate, placed between two pieces of paper which in turn were placed between two glass plates, and the assembly put into a vacuum oven. It is heated and evacuated at about 60° C. and 130 μmHG overnight. Flat membranes are cut from the film thus obtained and used for gas permeation measurements.

Films were made for the four polymers as well as three blends of the four polymers. Films of 0, 5.0, 10.0 and 20.0 mole percent sulfonate groups are used. The membranes of 2.5, 7.5 and 15.0 mole percent are prepared by blending the appropriate polymers. The blends are made by solution blending in DMF. For moisture sensitive solutions, such as polyether sulfone and its blends in DMF, the film casting and subsequent evaporation overnight is performed in a dry environment, e.g., in a box with a continuous stream of dry $N_2$ flowing through.

Gas Permeation Measurements

Gas permeation measurements are carried out at 25° C. and 257 cmHg (about 50 psi) differential pressure across the flat membrane samples. A variable pressure constant volume gas permeation system with the small cell was used for all measurements. The results are compiled in the Table.

TABLE

GAS PERMEATION DATA OF POLYETHERSULFONE AND SULFONATED POLYETHERSULFONES AT 25° C. AND 257 cmHg DIFFERENTIAL PRESSURE

| Example | Mole Percent of $SO_3H$ in Polymer | Permeability[a] | | | | Separation Factor | | |
|---|---|---|---|---|---|---|---|---|
| | | $N_2$ | $CH_4$ | $O_2$ | $CO_2$ | $N_2/CH_4$ | $CO_2/CH_4$ | $O_2/N_2$ |
| 1[c] | 0 | 0.075 | 0.064 | 0.44 | 2.6 | 1.2 | 41 | 5.9 |
| 2 | 2.5[b] | 0.053 | 0.042 | 0.35 | 2.1 | 1.3 | 50 | 6.6 |
| 3 | 5.0 | 0.028 | 0.018 | 0.18 | 1.1 | 1.6 | 61 | 6.4 |
| 4 | 7.5[b] | 0.037 | 0.026 | 0.24 | 1.5 | 1.4 | 58 | 6.5 |
| 5 | 10.0 | 0.030 | 0.014 | 0.20 | 1.1 | 2.1 | 79 | 6.7 |
| 6 | 15.0[b] | 0.021 | 0.0087 | 0.17 | 0.92 | 2.4 | 106 | 8.1 |

TABLE-continued
GAS PERMEATION DATA OF POLYETHERSULFONE AND SULFONATED POLYETHERSULFONES AT 25° C. AND 257 cmHg DIFFERENTIAL PRESSURE

| Example | Mole Percent of SO$_3$H in Polymer | Permeability[a] | | | | Separation Factor | | |
|---|---|---|---|---|---|---|---|---|
| | | N$_2$ | CH$_4$ | O$_2$ | CO$_2$ | N$_2$/CH$_4$ | CO$_2$/CH$_4$ | O$_2$/N$_2$ |
| 7 | 20.0 | 0.0084 | 0.003 | 0.074 | 0.40 | 2.8 | 133 | 8.8 |

[a]units, $\frac{cm^3(STP) \cdot cm^d}{cm^2 \cdot s \cdot cmHg} \times 10^{10}$

[b]A blend of the two polymers immediately above and below it in this table.

[c]Not an example of the invention.

[d]To convert to SI units: $1[cm^2(STP) \cdot cm \cdot cm^{-2} \cdot s^{-1} \cdot (cmHg)^{-1}] = 0.3347 \times 10^{10}[fmol \cdot m \cdot m^{-2} \cdot s^{-1} \cdot Pa^{-1}]$.

The examples demonstrate that sulfonates of polyether sulfones have good separation factors for oxygen-nitrogen and carbon dioxide methane separations.

What is claimed is:

1. A method of separating a gas comprising carbon dioxide from a mixture of gases containing carbon dioxide and light hydrocarbons, wherein the method comprises
   A. contacting the gas mixture with a membrane containing a thin dense discriminating layer comprising a polymer of sulfonated polyether sulphone under conditions such that carbon dioxide selectively permeates through the membrane to the other side of the membrane such that the separation factor for carbon dioxide over light hydrocarbons is 50 or greater; and,
   B. removing the permeated carbon dioxide from the other side of the membrane.

2. The method of claim 1 wherein a pressure differential is maintained across the membrane between the side of the membrane in contact with the gas mixture and the other side of the membrane wherein the higher pressure is maintained on the side of the membrane in contact with the gas mixture.

3. The method of claim 2 wherein the sulphonate polyether sulphone comprises units which correspond to the formula

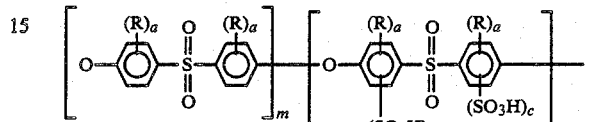

wherein
R is independently in each occurrence alkyl or halo
a is independently in each occurrence an integer of about 0 to about 4;
b is independently in each occurrence 0 to 4;
c is independently in each occurrence 0 to 4;
m is 0 or greater;
n is 1 or greater, with the provisos that in each ring a+b is 0 to 4, in each ring a+b is 0 to 4, and b+c is at least 1.

4. The method of claim 3 wherein between about 1 and about 20 percent of the sulfone units in the polymer contain pendant sulfonate moieties.

5. The method of claim 4 wherein between about 10 and about 15 percent of the sulfone units in the polymer contain pendant sulfonate moieties.

6. The process of claim 5 wherein
R is C$_{1-10}$ alkyl or bromo;
a is 0 to 4;
b is 0 to 4;
and the sum of b and c in each unit is 1.

7. The method of claim 6 wherein the pressure is between 280 to 900 psi.

8. The method of claim 6 wherein the temperature is between −10° to 120 degrees Celsius.

9. The method of claim 5 wherein the separation factor for carbon dioxide over light hydrocarbons is 70 or greater.

* * * * *

UNITED STATES PATENT AND TRADEMARK OFFICE
CERTIFICATE OF CORRECTION

PATENT NO. : 4,717,395
DATED : January 5, 1988
INVENTOR(S) : Cherry C. Chiao

It is certified that error appears in the above-identified patent and that said Letters Patent is hereby corrected as shown below:

Column 4, l. 53, "0.05" should read --5.05--;

Column 6, l. 36, after "130" should be --µmHg--;

Column 8, l. 22, a semi-colon should be after "halo".

Signed and Sealed this

Fourth Day of October, 1988

Attest:

DONALD J. QUIGG

Attesting Officer

Commissioner of Patents and Trademarks